(12) United States Patent
Bertolotti

(10) Patent No.: US 9,333,595 B2
(45) Date of Patent: May 10, 2016

(54) TOOL HOLDER

(71) Applicant: George Bertolotti, San Ramon, CA (US)

(72) Inventor: George Bertolotti, San Ramon, CA (US)

(73) Assignee: George Bertolotti, San Ramon, CA (US)

( * ) Notice: Subject to any disclaimer, the term of this patent is extended or adjusted under 35 U.S.C. 154(b) by 0 days.

(21) Appl. No.: 14/703,819

(22) Filed: May 4, 2015

(65) Prior Publication Data
US 2015/0231743 A1 Aug. 20, 2015

Related U.S. Application Data

(63) Continuation-in-part of application No. 13/546,632, filed on Jul. 11, 2012, now abandoned.

(51) Int. Cl.
A47F 5/00 (2006.01)
B23K 37/00 (2006.01)
B23K 37/02 (2006.01)

(52) U.S. Cl.
CPC ............. B23K 37/006 (2013.01); B23K 37/02 (2013.01)

(58) Field of Classification Search
CPC ...... B23K 37/02; B23K 3/027; B23K 37/006; F16M 13/02; A01K 97/10; B25H 1/0021; B25H 1/0042; B25H 3/04; A47B 81/008; A47F 7/0021; A47F 7/0028
USPC ........... 211/60.1, 62–63, 69.9, 69.8; 248/111, 248/117.1
See application file for complete search history.

(56) References Cited

U.S. PATENT DOCUMENTS

| 424,041 | A | | 3/1890 | Ward | |
| 1,481,949 | A | | 1/1924 | Andreck et al. | |
| 1,554,481 | A | | 9/1925 | Andreck | |
| 1,779,427 | A | | 10/1930 | Gillet | |
| 1,783,119 | A | | 11/1930 | Hacking | |
| 2,527,435 | A | * | 10/1950 | Little | B23K 3/027 219/242 |
| 4,700,830 | A | * | 10/1987 | O'Brien | B05C 17/0245 15/257.06 |
| 5,178,354 | A | | 1/1993 | Engvall | |
| 5,823,363 | A | * | 10/1998 | Cassel | A61M 5/3213 206/366 |
| 8,851,502 | B2 | * | 10/2014 | Gaudiano | A61H 3/04 135/67 |
| 2008/0135533 | A1 | * | 6/2008 | Ertmer | B23K 9/32 219/136 |
| 2010/0108827 | A1 | * | 5/2010 | Teraoka | B23K 3/027 248/117.3 |
| 2011/0095009 | A1 | * | 4/2011 | Kindig | B23K 9/10 219/130.1 |

* cited by examiner

Primary Examiner — Christopher Garft
(74) Attorney, Agent, or Firm — Kali Law Group, P.C.

(57) ABSTRACT

Welding tool holders are presented including: a welding tool receiving bracket having a surface, where the surface forms a first partial cylinder that forms two connected arms extending outwardly to define a first vertical opening for receiving a first welding tool, the first partial cylinder having a first diameter, where the first partial cylinder is vertically oriented, where the first partial cylinder includes an upper edge, where the welding tool receiving bracket further includes a lower surface extending downwardly from the surface and forming a second partial cylinder, the second partial cylinder having a second diameter; and an attachment portion extending away from the surface with respect to the first vertical opening.

15 Claims, 4 Drawing Sheets

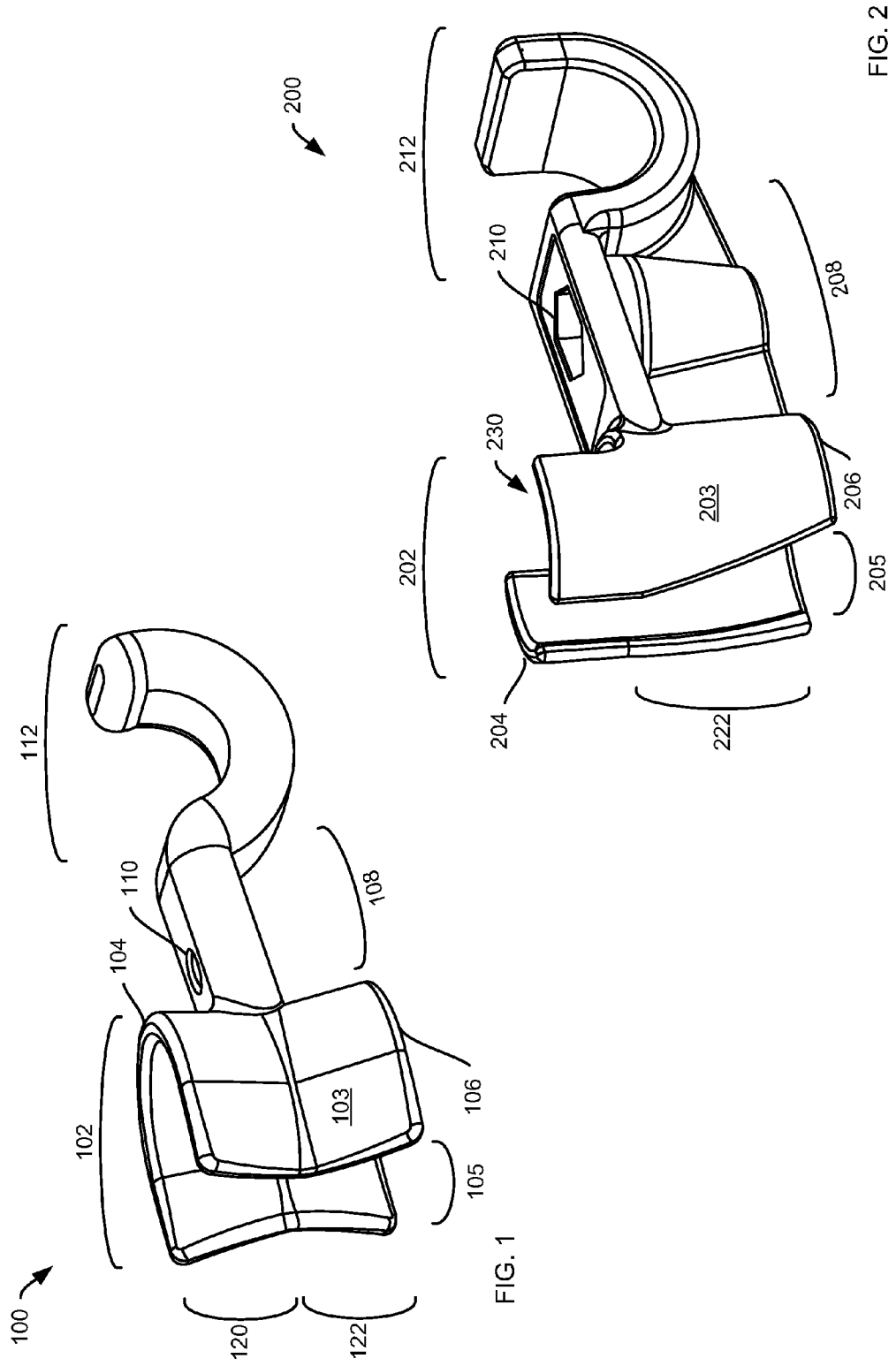

TOOL HOLDER

BACKGROUND

Metal Inert Gas (MIG) welding is the most pervasive welding method utilized in modern manufacturing and is suitable for a variety of manufacturing and fabrication processes. A MIG welder operates by feeding wire through a guide to an operator gun or torch. This allows an operator to efficiently and continuously weld long beads. However, during fabrication operations, an operator may be required to pause for any number of reasons such as checking fitment or clearance. When these pauses occur, there is often no safe or practical place to rest a welding gun since the welding gun operates by depressing a trigger, which may be activated when the welding gun is laid down. Many welders have set a welding gun down only to find a significant amount of unspooled wire released and wasted. Compounding the danger is the high pressure gas and high electrical currents that are released or exposed when the trigger is depressed. Safety, productivity, and wasted materials are on-going concerns in utilizing modern welding tools.

As such tool holders are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, welding tool holders are presented including: a welding tool receiving bracket having a surface, where the surface forms a first partial cylinder that forms two connected arms extending outwardly to define a first vertical opening for receiving a first welding tool, the first partial cylinder having a first diameter, where the first partial cylinder is vertically oriented, where the first partial cylinder includes an upper edge, where the welding tool receiving bracket further includes a lower surface extending downwardly from the surface and forming a second partial cylinder, the second partial cylinder having a second diameter; and an attachment portion extending away from the surface with respect to the first vertical opening. In some embodiments, welding tool holders further include: a connecting arm having a proximal end and a distal end, the proximal end attached with the attachment portion; and a base attached with the distal end of the connecting arm. In some embodiments, welding tool holders further include: a sleeve having a sleeve surface, where the sleeve surface forms a third partial cylinder that forms two connected arms extending outwardly to define a second vertical opening for receiving a second welding tool, the third partial cylinder having a third diameter, where the sleeve is sized to mechanically couple along an interior of the first partial cylinder, where the third partial cylinder is vertically oriented, where the third partial cylinder includes a sleeve upper edge, and where the sleeve includes a lower surface extending downwardly from the surface and forming a fourth partial cylinder, the fourth partial cylinder having a fourth diameter. In some embodiments, the sleeve and the a welding tool receiving bracket are aligned by a spline and groove arrangement. In some embodiments, welding tool holders further include: a tapered sleeve stop formed along an outer portion of the sleeve surface, where the tapered sleeve stop is positioned to form a stop with the upper edge of the first partial cylinder, and where a tapered portion of the tapered sleeve stop aligns with the upper edge of the first partial cylinder.

In some embodiments, the first diameter is selected to accommodate the first welding tool and the second diameter is selected to accommodate a first welding tool cable. In some embodiments, the third diameter is selected to accommodate the second welding tool and the fourth diameter is selected to accommodate a second welding tool cable. In some embodiments, the upper edge forms a raised tab extending vertically from the upper edge and positioned opposite the vertical opening for supporting the first welding tool. In some embodiments, the first welding tool and second welding tool include: a metal inert gas (MIG)/gas metal arc welding (GMAW) welding gun, a tungsten inert gas (TIG) welding torch, a shielded metal arc welding (SMAW) electrode holder, and a gas torch. In some embodiments, the connecting arm is selected from the group consisting of: a rigid connecting arm, a telescoping connecting arm, a flexible arm, and an articulating connecting arm. In some embodiments, the second partial cylinder further includes; a first cutaway portion positioned along a first side of the second vertical opening to the sleeve upper edge; and a second cutaway portion positioned along a second side of the second vertical opening to the sleeve upper edge. In some embodiments, the second partial cylinder further includes: a scoop formed along the sleeve upper edge and positioned opposite the second vertical opening, the scoop configured for aligning the second welding tool.

In other embodiments, welding tool holders are presented including: a welding tool receiving bracket having a surface, where the surface forms a first partial cylinder that forms two connected arms extending outwardly to define a first vertical opening for receiving a first welding tool, the first partial cylinder having a first diameter, where the first partial cylinder is vertically oriented, where the first partial cylinder includes an upper edge, where the welding tool receiving bracket further includes a lower surface extending downwardly from the surface and forming a second partial cylinder, the second partial cylinder having a second diameter; an attachment portion extending away from the surface with respect to the first vertical opening; and a sleeve having a sleeve surface, where the sleeve surface forms a third partial cylinder that forms two connected arms extending outwardly to define a second vertical opening for receiving a second welding tool, the third partial cylinder having a third diameter, where the sleeve is sized to mechanically couple along an interior of the first partial cylinder, where the third partial cylinder is vertically oriented, where the third partial cylinder includes a sleeve upper edge, and where the sleeve includes a lower surface extending downwardly from the surface and forming a fourth partial cylinder, the fourth partial cylinder having a fourth diameter.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustrative representation of a tool holder in accordance with embodiments of the present invention;

FIG. 2 is an illustrative representation of a tool holder in accordance with embodiments of the present invention;

DETAILED DESCRIPTION

Figure 3:
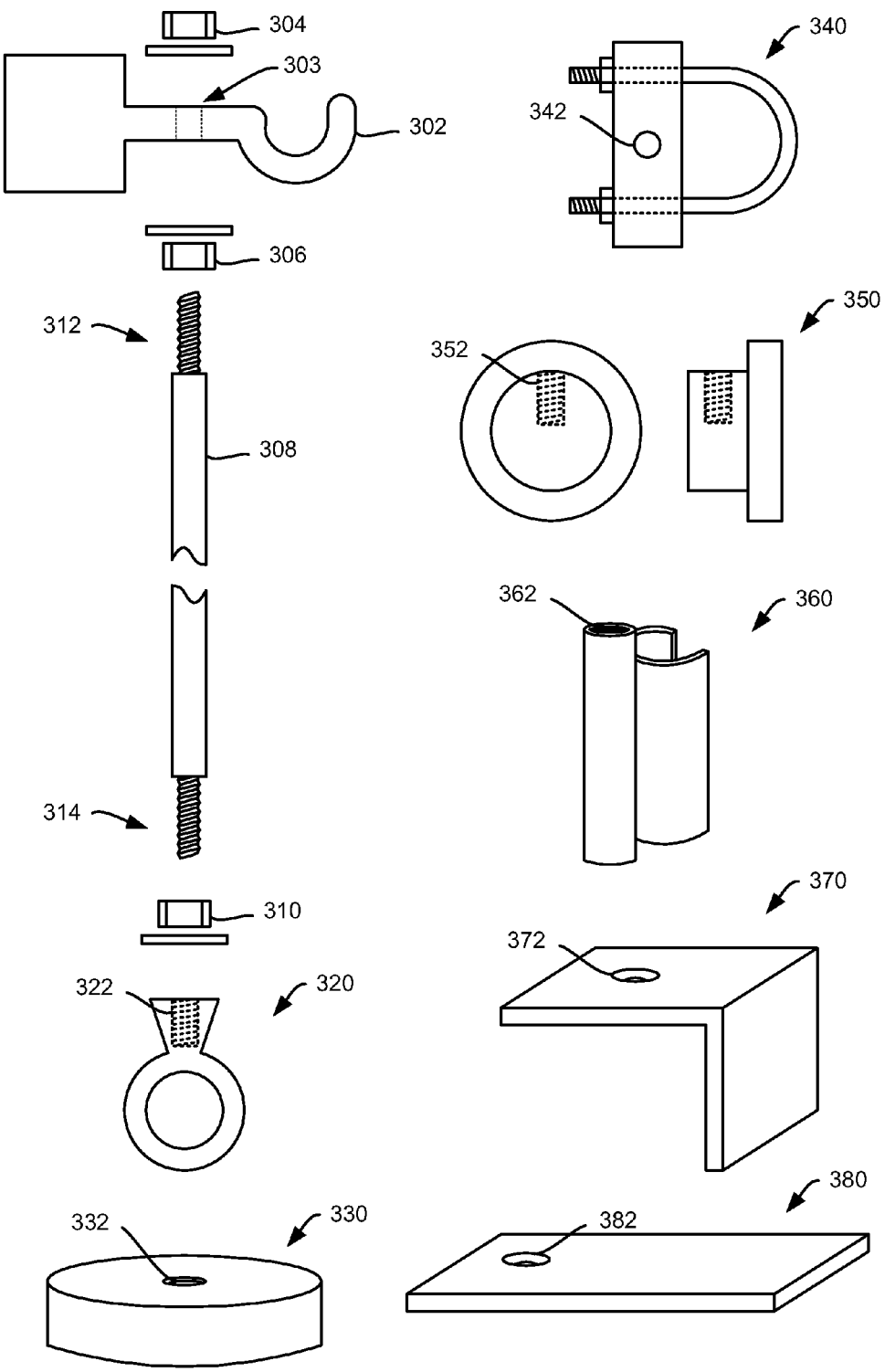
FIG. 3 is an illustrative representation of various bases for tool holders in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

FIG. 1 is an illustrative representation of a tool holder 100 in accordance with embodiments of the present invention. As illustrated, tool holder 100 includes tool receiving bracket 102 having surface 103 that forms a partial cylinder. In turn, surface 103 includes at least the following elements: upper edge 104, lower edge 106, and opening 105. As illustrated, opening 105 extends vertically from upper edge 104 to lower edge 106. It may be appreciated that the use of terms for describing configuration are for illustrative purposes only and should not be construed as limiting. For example, although the term "vertically" is utilized to describe the opening in a particular configuration, the term should not be construed to require any particular spatial orientation. In some embodiments, opening may be upwardly flared 120, or downwardly flared 122 or both upwardly and downwardly flared as illustrated. It may be appreciated that flaring may allow a tool such as a welding tool to be more easily received and released. However, in some embodiments, flaring is not utilized or required. In some embodiments, the partial cylinder may have a diameter in a range of 0.5 inches to 2.5 inches. In some embodiments, the opening may have a width in a range of 0.5 inches to 2.5 inches.

Further illustrated is attachment portion 108 that extends away from surface 103 with respect to upper edge 104 and lower edge 106. As illustrated, attachment portion 108 includes hole feature 110 for attachment with a connecting arm and a base. Connecting arms and bases will be discussed in further detail below for FIG. 3. In some embodiments, attachment portions may include other features such as: a slot feature, a molded nut feature, a molded bolt feature, an articulating feature, and a threaded feature without limitation. In still other embodiments not illustrated, tool holders may include a belt attachment in mechanical communication with attachment portion 108. It may be appreciated that some belt attachment embodiments lack an accessory hook such as those illustrated here.

Still further as illustrated, accessory hook 112 may be mechanically coupled with attachment portion 108 and extend therefrom. It may be appreciated that accessory hook 112 may extend in any direction from attachment portion 108 without departing from embodiments provided herein. In some embodiments, accessory hook 112 may further include a retention strap (not illustrated) for securing an accessory or cable. In some embodiments, tool holder 100 may be suitable for temporarily securing a variety of welding tools including: a metal inert gas (MIG) welding gun, a tungsten inert gas (TIG) welding torch, a shielded metal arc welding (SMAW) electrode holder, and a gas torch. It may be appreciated tool holder 100 may be manufactured utilizing any number of processes without departing from embodiments provided herein such as, for example, injection molding, casting, machining, 3D printing, and the like.

FIG. 2 is an illustrative representation of a tool holder 200 in accordance with embodiments of the present invention. As illustrated, tool holder 200 includes tool receiving bracket 202 having surface 203 that forms a partial cylinder. In turn, surface 203 includes at least the following elements: upper edge 204, lower edge 206, and opening 205. As illustrated, opening 205 extends vertically from upper edge 204 to lower edge 206. It may be appreciated that the use of terms describing configuration are for illustrative purposes only and should not be construed as limiting. For example, although the term "vertically" is utilized to describe the opening in a particular configuration, the term should not be construed to require any particular spatial orientation. In some embodiments, surface 203 may further include cutaway portion 230 that extends from upper edge 204 and proximate with attachment portion 208. In other embodiments, surface 203 may further include a widened opening cutaway portion 222 that extends along the opening downward toward lower edge 206. It may be appreciated that a cutaway portion and a widened opening cutaway portion provides additional clearance that may allow a tool such as a welding tool to be more easily received and released. However, some embodiments have no cutaway portions. In some embodiments, the partial cylinder may have a diameter in a range of 0.5 inches to 2.5 inches. In some embodiments, the opening may have a width in a range of 0.5 inches to 2.5 inches.

Further illustrated is attachment portion 208 that extends away from surface 203 with respect to upper edge 204 and lower edge 206. As illustrated, attachment portion 208 includes molded nut feature 210 for attachment with a connecting arm and a base. Connecting arms and bases will be discussed in further detail below for FIG. 3. In some embodiments, attachment portions may include other features such as: a hole feature, a slot feature, a molded bolt feature, an articulating feature, and a threaded feature without limitation. In still other embodiments not illustrated, tool holders may include a belt attachment in mechanical communication with attachment portion 208. It may be appreciated that some belt attachment embodiments lack an accessory hook such as those illustrated here.

Still further as illustrated, accessory hook 212 may be mechanically coupled with attachment portion 208 and extend therefrom. It may be appreciated that accessory hook 212 may extend in any direction from attachment portion 208 without departing from embodiments provided herein. In some embodiments, accessory hook 212 may further include a retention strap (not illustrated) for securing an accessory or cable. In some embodiments, tool holder 200 may be suitable for temporarily securing a variety of welding tools including: a MIG welding gun, a TIG welding torch, an SMAW electrode holder, and a gas torch. It may be appreciated tool holder 200 may be manufactured utilizing any number of processes without departing from embodiments provided herein such as, for example, injection molding, casting, machining, 3D printing, and the like.

FIG. 3 is an illustrative representation of various bases for tool holders in accordance with embodiments of the present invention. As noted above, tool holders may further include connecting arms and bases. As illustrated, connecting arm 308 may include proximal end 312 and distal end 314. Proximal end 312 of connecting arm 308 may be attached with tool holder 302 at attachment portion 303. Nuts 304, 306, and 310 may be utilized for attaching, locking, or otherwise adjusting fitment of tool holder embodiments. The nuts shown are for illustrative purposes only and should not be construed as limiting with respect to size, shape, type, or number. It may be appreciated that connecting arms may be embodied in various ways without departing from embodiments herein and may include: a rigid connecting arm (illustrated), a telescoping connecting arm (not illustrated), a flexible arm (not illustrated), and an articulating connecting arm (not illustrated). Further as illustrated, connecting arm embodiments may be attached with any number of base embodiments at distal end 314. Base embodiments may include any number of arrangements such as, for example, a ring arrangement 320, a platform arrangement 330, a clamping arrangement 340, a magnetic arrangement 350, a barrel arrangement 360, an angled plate arrangement 370, and a flat plate arrangement 380 without departing from embodiments disclosed herein.

In operation, ring arrangement 320 may be useful in providing an open attachment point for storing or otherwise attaching tool holder embodiments with a stationary surface or object or a mobile surface or object. Ring arrangement 320 may include a threaded portion 322 for receiving connecting arm 308 or may be configured to slidingly engage connecting arm embodiments. Further, platform arrangement 330 may be useful in providing an independent support on a surface or substrate. It may be appreciated that platform arrangements may include any number of shapes, sizes, or weights without departing from present embodiments. Platform arrangement 330 may include a threaded portion 332 for receiving connecting arm 308 or may be configured to slidingly engage connecting arm embodiments. Clamping arrangement 340 may be useful in providing an attachment point with a pipe, conduit, tube, strap, or rod surface. Clamping arrangement 340 may include a threaded portion 342 for receiving connecting arm 308 or may be configured to slidingly engage connecting arm embodiments.

Still further, in operation, magnetic arrangement 350 may be useful in providing an attachment point with a magnetically sensitive surface. Magnetic arrangement 350 may include a threaded portion 352 for receiving connecting arm 308 or may be configured to slidingly engage connecting arm embodiments. Further, barrel arrangement 360 may be useful in providing an attachment point with a rounded surface such as a pipe or conduit. Barrel arrangement 360 may slidingly engage connecting arm embodiments at shaft 362 or may be configured to threadingly engage connecting arm embodiments. Still further, angled plate arrangement 370 may be useful in providing an attachment point with vertical surfaces. Angled plate arrangement may be attached with a vertical surface in any manner known in the art without departing from embodiments herein. Angled plate arrangement 370 may slidingly engage connecting arm embodiments at point 372 or may be configured to threadingly engage connecting arm embodiments. Still further, flat plate arrangement 380 may be useful in providing an attachment point with horizontal surfaces. Flat plate arrangement may be attached with a horizontal surface in any manner known in the art without departing from embodiments herein. Flat plate arrangement 380 may slidingly engage connecting arm embodiments at point 382 or may be configured to threadingly engage connecting arm embodiments.

Figure 4C:
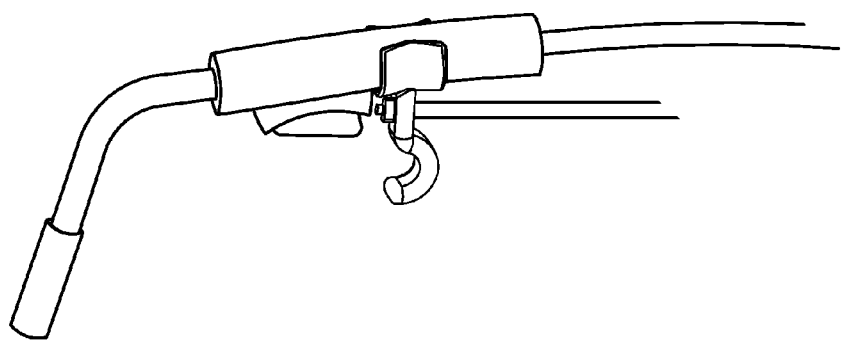
FIGS. 4A-4C are illustrative representations of a method of use for tool holders in accordance with embodiments of the present invention.
Figure 4B:
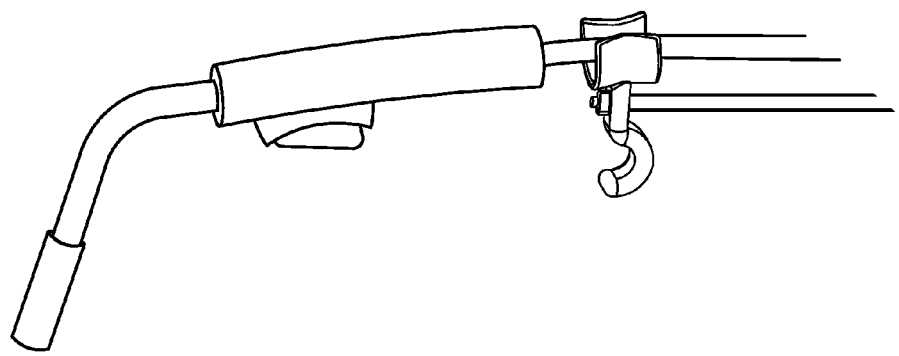
Figure 4A:
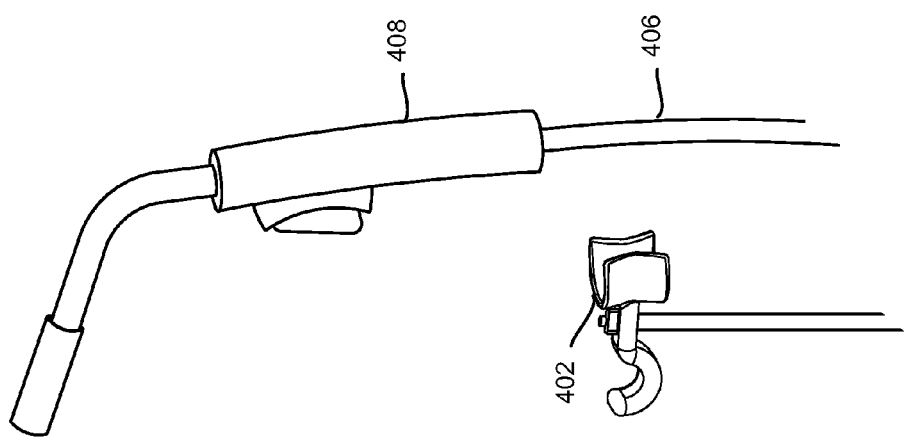

FIGS. 4A-4C are illustrative representations of a method of use for tool holders in accordance with embodiments of the present invention. As illustrated in FIG. 4A, tool 408 is in proximity with tool holder embodiments 402 as disclosed herein. In the illustration, a MIG gun is in proximity with the tool holder, however, other tools such as, a TIG welding torch, an SMAW electrode holder, and a gas torch may be utilized without departing from embodiments provided herein. An operator may locate connection assembly 406 in tool receiving bracket as illustrated in FIG. 4B. Connection assemblies may include: a hose, a wire guide, a power cable, and a process cable without departing from embodiments provided herein. In some embodiments, the opening is sized narrowly enough to prevent release of a tool, but wide enough to receive a connection assembly. An operator may then slide the tool toward the receiving bracket along the connection assembly to engage the tool with the tool receiving bracket as illustrated in FIG. 4C. Tool 408 may subsequently be removed from tool holder 402 by an operator. In some embodiments, an operator may utilize accessory hooks for hanging a portion of a connecting assembly or some other accessory such as a helmet for example. In still other embodiments, an operator may attach tool holder 402 to a stationary or mobile surface via attachment point as disclosed above.

ALTERNATE EMBODIMENTS

Figure 5:
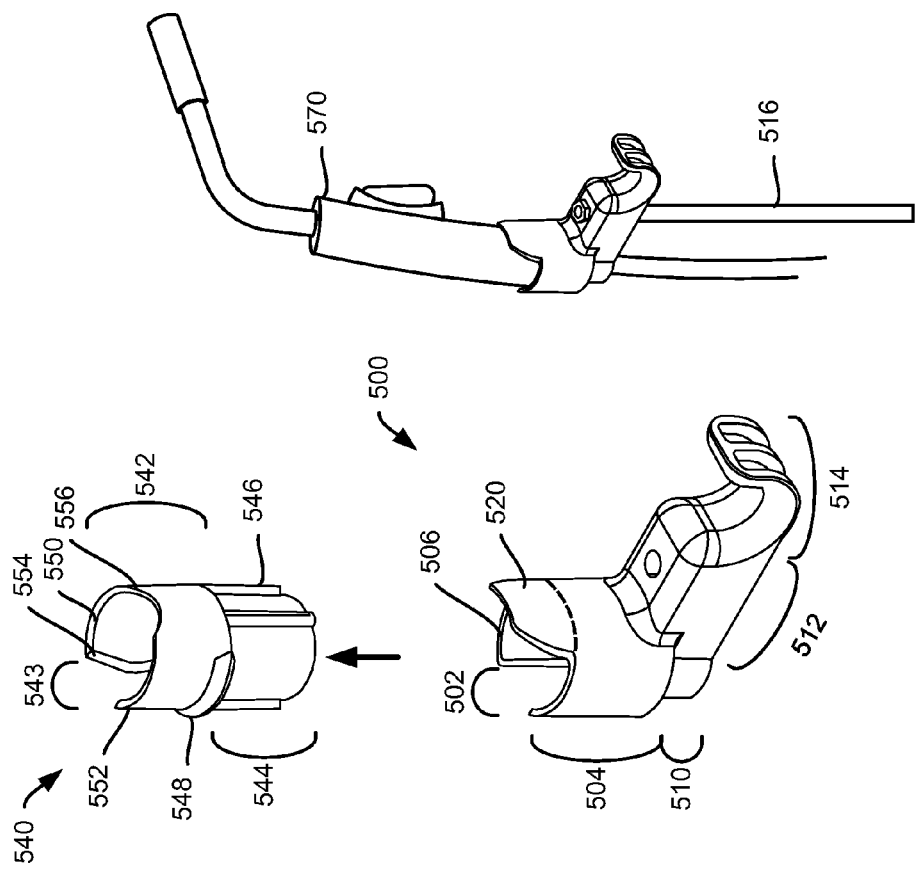
FIG. 5 is an illustrative representation of a tool holder in accordance with embodiments of the present invention.

FIG. 5 is an illustrative representation of a tool holder in accordance with embodiments of the present invention. In the illustrated representation, welding tool 570 may be secured using welding tool receiving bracket 500. In embodiments, welding tools may include a metal inert gas (MIG)/gas metal arc welding (GMAW) welding gun, a tungsten inert gas (TIG) welding torch, a shielded metal arc welding (SMAW) electrode holder, and a gas torch without limitation. As illustrated welding tool receiving bracket 500 may include a welding tool receiving bracket having a surface that forms first partial cylinder 504 and second partial cylinder 510 which are vertically oriented. First partial cylinder 504 may form two connected arms extending outwardly to define vertical opening 502 for receiving welding tool 570. In embodiments, the vertical opening may have a width in a range of approximately 0.5 inches to 1.25 inches. In embodiments, first partial cylinder 504 may include upper edge 506. It may be appreciated that first partial cylinder 504 has a first diameter. In embodiments, the first diameter may be in a range of approximately 1.25 to 1.75 inches to accommodate a first welding tool.

It may be further appreciated that second partial cylinder 510 has a second diameter. In embodiments, the second diameter may be is in a range of approximately 1.00 to 1.25 inches to accommodate a first welding tool cable. In addition, welding tool receiving bracket 500 may include attachment portion 512 that extends away from the surface with respect to first vertical opening 502. In addition, welding tool receiving bracket 500 may include connecting arm 516 having a proximal end and a distal end. In embodiments, connecting arms may include: a rigid connecting arm, a telescoping connecting arm, a flexible arm, and an articulating connecting arm without limitation. As may be seen the proximal end may be attached with attachment portion 512. In embodiments, attachment portions may include an attachment point that includes a feature such as: a hole feature, a slot feature, a molded nut feature, a molded bolt feature, an articulating feature, and a threaded feature. In some embodiments, a belt attachment in mechanical communication with the attachment portion may be utilized. Further in embodiments, distal end of connecting arm 516 may be attached with a base such as base 330 in FIG. 3. Still further, as illustrated, is raised tab 520 along upper edge 506 that extends vertically from upper edge 506 and may be positioned opposite vertical opening 502 for supporting or stabilizing the first welding tool. In some embodiments, a raised tab is not required to support or stabilize the first welding tool.

Embodiments disclosed herein may accommodate different sizes of welding tools. As such, embodiments may include sleeve 540. As illustrated, sleeve surface forms third partial cylinder 542 and fourth partial cylinder 544 which are vertically oriented. As illustrated, third partial cylinder 542 forms two connected arms extending outwardly to define second vertical opening 543 for receiving a second welding tool (see 610 FIG. 6) and may include sleeve upper edge 550. As noted above, in embodiments, welding tools may include a metal inert gas (MIG)/gas metal arc welding (GMAW) welding gun, a tungsten inert gas (TIG) welding torch, a shielded metal arc welding (SMAW) electrode holder, and a gas torch without limitation. Further as illustrated, sleeve 540 includes a lower surface extending downwardly from the surface to form fourth partial cylinder 544. It may be appreciated that third partial cylinder 542 has a third diameter. In embodiments, the third diameter may be in a range of approximately 1.25 to 1.50 inches to accommodate a second welding tool. It may be further appreciated that fourth partial cylinder 544 has a fourth diameter. In embodiments, the fourth diameter may be in a range of approximately 1.00 to 1.25 inches to accommodate a second welding tool cable. In further embodiments, the second vertical opening may have a width in a range of approximately 0.5 inches to 1.25 inches.

Sleeve 540 may include a number of splines 546 that align sleeve 540 with welding tool receiving bracket 500 in a spline and groove arrangement. Sleeve 540 may further include tapered sleeve stop 548 formed along an outer portion of the sleeve surface. As illustrated, tapered sleeve stop 548 is positioned to form a stop with upper edge 506 of first partial cylinder 504 such that a tapered portion of tapered sleeve stop 548 aligns with upper edge 506 of third partial cylinder 542. It may be appreciated that a tapered sleeve stop may serve both as a stop and as an aligning feature. Sleeve 540 may also include a number of features that improve tool handling. For example, as illustrated, sleeve 540 may include cutaway portion 552 and 554 positioned along either side of second vertical opening 543. Cutaway portions may be useful in more easily receiving a welding tool. In addition, sleeve 540 may include scoop 556 formed along the sleeve upper edge 550 and positioned opposite second vertical opening 543. As may be appreciated, scoop 556 may be useful for aligning the second welding tool.

Figure 6:
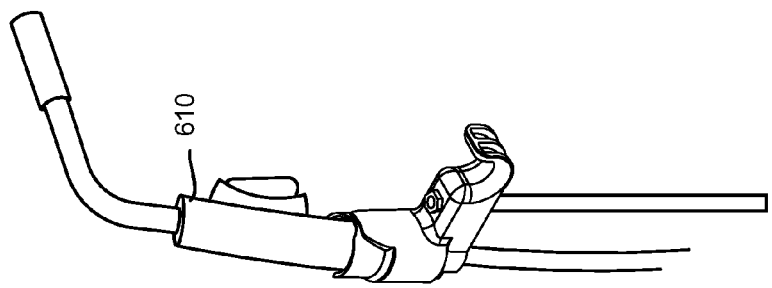
FIG. 6 is an illustrative representation of a tool holder in accordance with embodiments of the present invention.

FIG. 6 is an illustrative representation of a tool holder 600 in accordance with embodiments of the present invention. As illustrated, sleeve 540 and welding tool receiving bracket 500 of FIG. 5 may be mechanically coupled. In particular, the sleeve is sized to mechanically couple along an interior of the first partial cylinder. As noted above, alignment may be supported by a spline and groove arrangement. In addition, the sleeve may be mechanically affixed with the receiving bracket: a pin, a screw, an expansion pin, and a tapered pin without limitation. As illustrated, second welding tool 610 and second welding tool cable may be secured in tool holder 600. As such, utilizing embodiments disclosed herein, a user may accommodate various sizes of welding tools by simply adding or removing a sleeve.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A welding tool holder comprising:
a welding tool receiving bracket having a surface, wherein
the surface forms a first partial cylinder that forms two connected arms extending outwardly to define a first vertical opening for receiving a first welding tool, the first partial cylinder having a first diameter, wherein the first partial cylinder is vertically oriented, wherein the first partial cylinder includes an upper edge, wherein the welding tool receiving bracket further includes a lower surface extending downwardly from the surface and forming a second partial cylinder, the second partial cylinder having a second diameter;
an attachment portion extending away from the surface with respect to the first vertical opening; and
a sleeve having a sleeve surface, wherein
the sleeve surface forms a third partial cylinder that forms two connected arms extending outwardly to define a second vertical opening for receiving a second welding tool, the third partial cylinder having a third diameter, wherein
the sleeve is sized to mechanically couple along an interior of the first partial cylinder, wherein
the third partial cylinder is vertically oriented, wherein
the third partial cylinder includes a sleeve upper edge, and wherein
the sleeve includes a lower surface extending downwardly from the surface and forming a fourth partial cylinder, the fourth partial cylinder having a fourth diameter.

2. The welding tool holder of claim 1, further comprising:
a connecting arm having a proximal end and a distal end, the proximal end attached with the attachment portion; and
a base attached with the distal end of the connecting arm.

3. The welding tool holder of claim 1 further comprising:
a tapered sleeve stop formed along an outer portion of the sleeve surface, wherein the tapered sleeve stop is positioned to form a stop with the upper edge of the first partial cylinder, and wherein a tapered portion of the tapered sleeve stop aligns with the upper edge of the first partial cylinder.

4. The welding tool holder of claim 1, wherein the first diameter is selected to accommodate the first welding tool and the second diameter is selected to accommodate a first welding tool cable.

5. The welding tool holder of claim 1, wherein the third diameter is selected to accommodate the second welding tool and the fourth diameter is selected to accommodate a second welding tool cable.

6. The welding tool holder of claim 1, wherein
the upper edge forms a raised tab extending vertically from the upper edge and positioned opposite the vertical opening for supporting the first welding tool.

7. The welding tool holder of claim 1, wherein the first welding tool and second welding tool are selected from the group consisting of: a metal inert gas (MIG)/gas metal arc welding (GMAW) gun, a tungsten inert gas (TIG) welding torch, a shielded metal arc welding (SMAW) electrode holder, and a gas torch.

8. The welding tool holder of claim 2, wherein the connecting arm is selected from the group consisting of: a rigid connecting arm, a telescoping connecting arm, a flexible arm, and an articulating connecting arm.

9. The welding tool holder of claim 1, wherein the second partial cylinder further comprises:
   a first cutaway portion positioned along a first side of the second vertical opening to the sleeve upper edge; and
   a second cutaway portion positioned along a second side of the second vertical opening to the sleeve upper edge.

10. The welding tool holder of claim 1, wherein the attachment portion comprises an attachment point that includes a feature selected from the group consisting of: a hole feature, a slot feature, a molded nut feature, a molded bolt feature, an articulating feature, and a threaded feature.

11. The welding tool holder of claim 1, wherein
   the first diameter is in a range of approximately 1.25 to 1.75 inches, and wherein
   the second diameter is in a range of approximately 1.00 to 1.25 inches.

12. The welding tool holder of claim 1, wherein
   the third diameter is in a range of approximately 1.25 to 1.50 inches, and wherein
   the fourth diameter is in a range of approximately 1.00 to 1.25 inches.

13. The welding tool holder of claim 1, wherein the first vertical opening has a width in a range of approximately 0.5 inches to 1.25 inches.

14. The welding tool holder of claim 1, further comprising a belt attachment in mechanical communication with the attachment portion.

15. The welding tool holder of claim 1, wherein the second partial cylinder further comprises:
   a scoop formed along the sleeve upper edge and positioned opposite the second vertical opening, the scoop configured for aligning the second welding tool.

\* \* \* \* \*